United States Patent [19]
Funk et al.

[11] Patent Number: 5,286,436
[45] Date of Patent: Feb. 15, 1994

[54] PRODUCING EXTRUDED SOLID PLASTIC SHEET AND FILM

[75] Inventors: Karl Funk, Griesheim; Heinz Gross, Rossdorf, both of Fed. Rep. of Germany

[73] Assignee: Rohm GmbH Chemische Fabrik, Darmstadt, Fed. Rep. of Germany

[21] Appl. No.: 972,379

[22] Filed: Nov. 5, 1992

Related U.S. Application Data

[62] Division of Ser. No. 711,948, Jun. 7, 1991, Pat. No. 5,242,742.

[30] Foreign Application Priority Data

Jun. 9, 1990 [DE] Fed. Rep. of Germany ....... 4018531

[51] Int. Cl.$^5$ ............................................. B29C 47/88
[52] U.S. Cl. ................. 264/210.2; 264/210.5; 264/237; 264/280; 425/325; 425/327; 425/371
[58] Field of Search ............... 264/176.1, 210.2, 280, 264/175, 210.5, 237, 40.6; 425/325, 371, 327

[56] References Cited

U.S. PATENT DOCUMENTS

| | | | |
|---|---|---|---|
| 2,791,801 | 5/1957 | Szantay | 264/210.2 |
| 2,815,308 | 12/1957 | Robinson et al. | 264/175 |
| 4,734,229 | 3/1988 | Johnson et al. | 264/280 |
| 4,826,560 | 5/1989 | Held | 425/371 |
| 4,858,139 | 8/1989 | Wirtz | 264/210.2 |
| 4,859,392 | 8/1989 | Vetter | 264/210.2 |
| 4,921,669 | 5/1990 | Vetter et al. | 264/280 |
| 4,994,229 | 2/1991 | Flecknoe-Brown | 425/325 |
| 5,149,481 | 9/1992 | Gross et al. | 264/210.2 |

FOREIGN PATENT DOCUMENTS

| | | |
|---|---|---|
| 0008543 | 8/1979 | European Pat. Off. |
| 0199824 | 11/1985 | European Pat. Off. |
| 2432778 | 1/1976 | Fed. Rep. of Germany |
| 3319279 | 12/1984 | Fed. Rep. of Germany ...... 264/280 |
| 3429818 | 3/1985 | Fed. Rep. of Germany |
| 3730043 | 3/1989 | Fed. Rep. of Germany |
| 54-17982 | 2/1979 | Japan |
| 58-131050 | 8/1983 | Japan |

OTHER PUBLICATIONS

Chemical Abstracts, vol. 91 (1979), S. Junji et al (Asahi Chemical Industry Co. Jpn. Kokai Tokyo Koho 79 17,982 (Cl. B29D7/02), Feb. 9, 1979.

*Primary Examiner*—Jeffery Thurlow
*Attorney, Agent, or Firm*—Oblon, Spivak, McClelland, Maier & Neustadt

[57] ABSTRACT

Extruded, smooth finished solid sheet or film, which may have a thickness < 1 mm, of a thermoplastic plastic (such as polycarbonate) with a glass transition temperature > 50° C., which under conditions of orientation displays optical birefringence, may be manufactured into a flat strip with smooth finished surfaces, to yield a strip which has characteristics as follows:

optical birefringence path difference less than or equal to 50 nm (single pass);
low surface roughness;
low variation in thickness;

by extrusion of the plastic in a thermoplastic state, through a slot nozzle;

wherein during or after the smoothing of the two surfaces one of the surfaces of the strip is cooled to below the glass transition temperature, while the other surface and the predominant part of the interior region of the strip remain in the thermoplastic state and the strip is cooled to below the glass transition temperature, under conditions which minimize the deforming forces on the surfaces of the extruded strip.

11 Claims, 1 Drawing Sheet

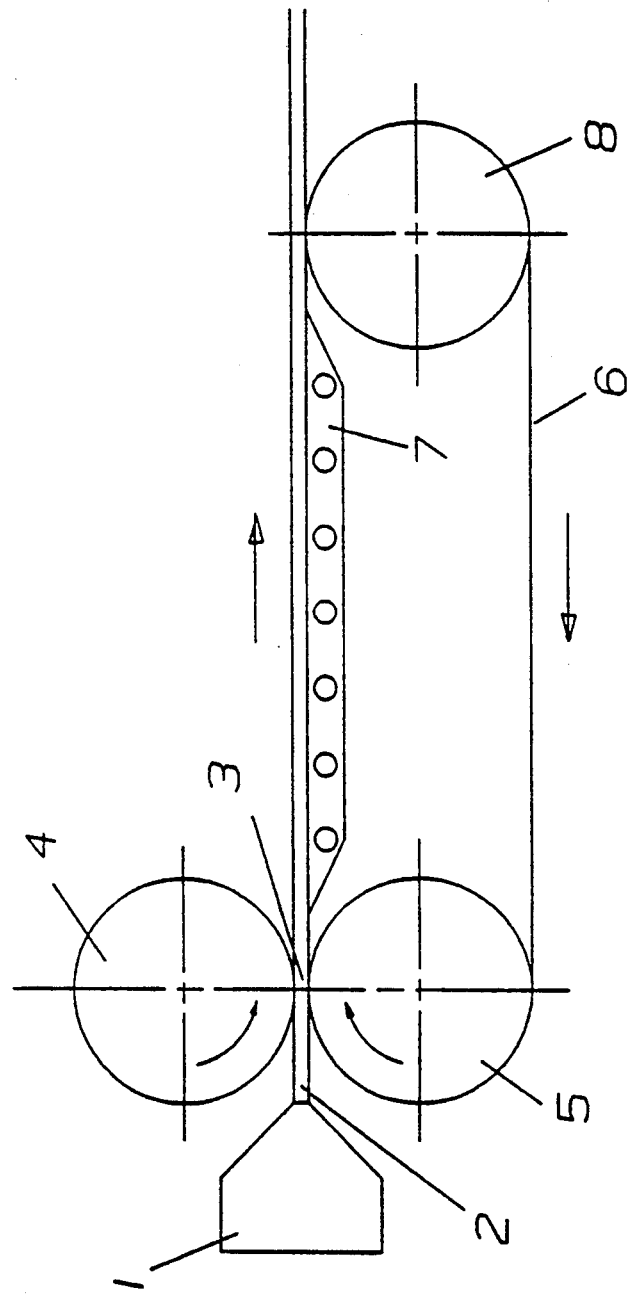

PRODUCING EXTRUDED SOLID PLASTIC SHEET AND FILM

This is a division of application Ser. No. 07/711,948, filed on Jun. 7, 1991 now Pat. No. 5,242,742.

BACKGROUND OF THE INVENTION

1. Field of the Invention

The present invention relates to an extruded, smooth finished solid sheet or film, comprised of thermoplastic material, particularly polycarbonate plastic, distinguished by a fine thickness tolerance, low surface roughness, low curvature, low thermal shrinkage, and, preferably, low birefringence of light. All of these properties are important in the use of extruded sheet or film in the manufacture of optically readable data storage devices. The present invention also relates to a method of manufacturing such extruded solid sheet or film, in wide sizes, and use of said materials in the manufacture of optical data storage devices.

2. Discussion of the Background

The requirements applied to plastic sheet or film intended for use in the manufacture of optically readable data storage devices are generally known. See Hennig, J., 1986, "Polymere als Substrate fuer optische Plattenspeicher", *Angew. Makromol. Chemie.*, vol. 145/146 pp. 391–409. According to Eur. Pat. B 8543, they should contain no foreign particles of size greater than 10 micron, and should not form any bubbles or cavities when thermoplastically processed; further, when formed they should display minimal optical birefringence.

According to Eur. Pat. A 199,824, molding compounds comprised of polymer component units having specific values of the difference of the positive and negative main polarizability are used, because then the orientations of the polymer molecules in the sheet or the like formed from such materials result in much less optical birefringence. Accordingly, optical data storage media with low optical birefringence can be formed from such plastics, with the size of the storage medium exceeding that of so-called "compact disks" (CDs) (120 mm). However, the range of choices for such plastics is very limited, and most available industrial plastics do not qualify.

Optical data storage media in the form of CDs are generally produced by injection molding. Other methods of manufacturing large-format optical data storage media begin with solid plastic sheets or films of thickness 0.1–2 mm which are subsequently provided with the information coding. Because the size of the characters is in the micron range and requires very accurate focusing of the reading system, the quality requirements applied to the sheet or film employed are very stringent. They involve, e.g., the surface roughness, the thickness tolerance, the curvature, and the thermal shrinkage. These quality requirements must be met uniformly over a large minimum extent—if possible, 300 mm or more in each direction over the surface.

Conventional extrusion technology is no longer capable of meeting these quality requirements under conditions where both the thickness of the sheet or film and the type of plastic must be freely selectable in response to demand. Various methods are known for improving the quality of extruded sheet or film, but these are inadequate to meet the requirements imposed.

Smooth finished extruded sheets of amorphous thermoplastic are conventionally produced by passing a slot-extruded strip through a polishing stack. In the gap between the rolls the surfaces of the strip are abruptly vitrified via the calendering rolls which are at a temperature below the glass transition temperature, so that only the interior of the strip remains in the thermoplastic state. In this process, an excess of the thermoplastic may be forced out of the roll gap against the direction of flow, forming a bead-like prominence on the strip in front of said gap.

If the strip is thinner than a certain thickness, the vitrified layers meet in the central plane, and therefore there is no longer any part of the thickness of the strip which is capable of flow; accordingly, the excess can no longer be forced out of the roll gap. As a result, the compression forces which develop in the roll gap are so great that the surfaces of the polishing rolls, or the bearings or stands of said rolls, may suffer damage. Such compression forces cannot be eliminated merely by reducing the extruding speed or increasing the turning speed of the calender, because then there is a hazard that the roll gap will not be fully occupied by the strip, resulting in failure to achieve the desired smoothing. It is impracticable to attempt to achieve the ideal state of a minimally thick bead having a uniform thickness over the entire width of the strip ahead of the roll gap, in the case of an intended thickness of the strip which is below a certain thickness. Smooth finished extruded sheets or films thinner than this cannot be produced by conventional calendering technology.

According to Ger. Pat. 2,432,778, thermoplastic films with advantageous surface properties, outstanding dimensional stability, and nearly isotropic properties may be produced by taking an extruded strip of thermoplastic material which has been extruded under minimal compression conditions and feeding it immediately after it emerges from the extruder to a take-up device comprised of two superposed synchronously driven endless conveyor belts between which the strip is compressed, widened, and pressed flat, wherewith the strip is carried along with and adheres to said belts and while disposed between said belts is cooled to below its glass transition temperature. At the entrance to the take-up device both conveyor belts are maintained at a temperature higher than the glass transition temperature of the plastic, and they are cooled in equal fashion in the later part of their excursion. The thickness tolerance achieved is 0.05–0.1 mm over a width of about 60 mm. It is not possible to produce optical birefringence with a difference in path of $<50$ nm. Further, the tolerance value stated is inadequate for optical data storage media.

According to Jap. pat. App. 54/017,982 (1979), smooth finished extruded films comprised of hard thermoplastics with improved uniformity of thickness are obtained by driving the calender adjoining the extrusion nozzle with a drive system which prevents fluctuations in movement. Very accurate thermal control of the individual calendering rolls is necessary. This extrusion technique is also inadequate to overcome the problem of optical birefringence.

Jap. pat. App. 57/014,065 (1983) discloses an extrusion method wherein the extruded strip of thermoplastic is rested on an endless conveyor belt after exiting the nozzle, and is allowed to cool there. No means of smoothing the free upper surface of the strip are provided. The result is a strip with an underside which is flat and amenable to good adhesive bonding.

Ger. Pat. 3,429,818 describes a method of extruding films comprised of thermoplastic with low optical birefringence, whereby a core layer of the thermoplastic is coextruded with two outer layers of polyethylene or another plastic which does not adhere to the core layer. A single-layer, low-birefringence film is obtained from the three-layer co-extrudate, by pulling off the two outer layers from the core layer. This method does not enable high surface smoothness of the surfaces of the core layer.

Plastic sheet 1-2 mm thick has been offered commercially which does satisfy the quality requirements imposed on optical data storage media. However, experience has shown that the most advanced extrusion and smoothing techniques cannot be employed to produce such quality on a consistent and reproducible basis. Therefore there is a strong need for sheet and film material of the necessary quality, and for a method of producing same.

In particular, there remains a need for extruded solid plastic sheet and film for manufacturing optical data storage media which meet the following quality requirements:

1. An optical birefringence path difference not exceeding 50 nm in a single pass through the sheet or film;
2. Variation in thickness not exceeding 0.1 mm in the course of dimensions of up to $700 \times 650$ mm;
3. For sheet or film with thickness $< 1.0$ mm, variation in thickness $< 0.05$ mm in the course of dimensions up to $700 \times 650$ mm;
4. Variation in thickness not exceeding 0.04 mm, preferably not exceeding 0.025 mm, in the course of dimensions of up to $300 \times 300$ mm;
5. Maximum surface roughness (Rmax according to DIN 4768) $< 300$ nm on at least one surface, and/or mean surface roughness (Rz according to DIN 4768) $< 150$ nm, preferably $< 100$ nm;
6. Surface roughness at the center (Ra according to DIN 4768) $< 40$ nm, preferably $< 25$ nm;
7. Curvature $< 1.6$ mm in the course of dimensions of up to $300 \times 300$ mm (where curvature is defined as the maximum distance of the free-lying sheet or film from a plane support surface);
8. Shrinkage of not more than 16% in the extrusion direction and/or not more than 5% transversely to the extrusion direction, when stored 30 min at 160° C.

While appropriate characteristics, configuration, and adjustment of the polishing stack will enable requirements 2-6 to be satisfied, for strip thicknesses greater than or equal to a critical value, there is no systematic way to approach the problem of meeting the other requirements, particularly those directed at achieving low birefringence. All previous attempts to achieve low birefringence have been limited by the constraint that they not interfere with or prevent the satisfaction of the other requirements.

SUMMARY OF THE INVENTION

Accordingly, it is one object of the present invention to provide a method of manufacturing solid extruded plastic sheet and film the surface qualities of which sheet and film satisfy requirements 2-8 for a thickness of $<1$ mm.

It is another object of the present invention to manufacture a solid extruded smooth-finished plastic sheet or film which in addition to possessing the above-mentioned surface qualities has an optical birefringence path difference less than or equal to 50 nm (for a single pass).

It is another object of the present invention to achieve the described advantages with conventional industrial types of plastics, of suitable purity.

It is another object of the present invention to provide optically readable storage devices which utilize such sheets or films.

It is another object of the present invention to provide an apparatus for preparing such sheets or films.

These and other objects, which will become apparent during the following detailed description, have been achieved by the inventors' discovery that such films may be produced by a method comprising extruding a thermoplastic material in the thermoplastic state from a slot nozzle, to form a flat strip, and smoothing the surfaces of the strip, wherein during or after the smoothing of both surfaces, one surface of the strip is cooled to below the glass transition temperature while the other surface and the predominant part of the interior region of the strip are maintained in the thermoplastic state; and said strip is cooled to below the glass transition temperature, under conditions which minimize the deforming forces on the surfaces of the extruded strip.

The inventors have also discovered that this method may be carried out on an apparatus, comprising:

(a) a slot nozzle fed by an extruder for producing a flat extruded strip, and (b) a smoothing apparatus comprised of at least one smooth-finished upper roll and a lower roll, for smoothing said flat strip in the gap between the upper and lower rolls;

wherein said upper roll can be cooled;

and said lower roll can be heated to a temperature in the thermoplastic state domain of the plastic;

and a smooth finished endless belt which is passed around said lower roll and guided over a planar cooling plate and a deflecting roll, back to the lower roll.

Systematic research on the sources of birefringence has revealed that the extruded thermoplastic strip is extremely sensitive to deforming forces during the vitrification, i.e., while the strip is being cooled to below the glass transition temperature. Apparently even minimally deforming forces lead to shear between already vitrified and still molten zones. At the boundaries between these zones, the shear causes molecular orientation. When a beam of light passes through such oriented regions, birefringence occurs.

Deforming forces are operative when the extruded strip is passed between two conveyor belts which are moving in parallel (as in the method according to Ger. Pat. 2,432,778) and adheres initially to both belts. These forces can arise as a result of even slight perturbations in the uniform advance of the two conveyor belts. Further, when the conveyor belt is cooled along with the extruded strip which is adhering to it, deforming forces arise when the belt and the strip have different coefficients of thermal expansion. This is the case with conventional conveyor belts comprised of steel. The difference in thermal contraction between the conveyor belt and the plastic strip has a deforming effect. Also, it is difficult to achieve completely uniform cooling over the entire width of the strip, and therefore the contraction is not uniform over the width. Also, there are limits imposed on the thermal thickness contraction, due to the stress of the conveyor belts. The forced advancing of the strip which is undergoing vitrification without sufficient degrees of freedom for the contraction forces results in orientations which inevitably lead to birefringence.

By taking this knowledge into account, the present improved extrusion and smoothing technique was devised which enables manufacture of solid extruded plastic sheet or film with an optical birefringence path difference of less than or equal to 50 nm (single pass), even for thicknesses < 1 mm. It was found that requirements 2-8, concerning surface qualities, can be satisfied at the same time. Solid sheet should be understood to mean sheets having no interior voids, having plane parallel surfaces, and having thickness > 0.5 mm; and films differs from sheets only in that their thickness is less than or equal to 0.5 mm (and therefore film has higher flexibility).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic cross section of an extrusion and smoothing apparatus for carrying out the invention.

DETAILED DESCRIPTION OF THE PREFERRED EMBODIMENTS

The present method of manufacturing a solid extruded plastic sheet or film with low birefringence by extruding the plastic in a thermoplastic state through a slot nozzle to form a flat extruded strip, and smoothing the surfaces of the strip, is characterized in that one surface of the strip is cooled to below the glass transition temperature during the smoothing, while the other surface and most of the interior region of the strip remain in the thermoplastic state. This surface remains in contact with a hot smoothing device. When subsequently the strip is cooled to below the glass transition temperature, conditions must be maintained which minimize the deforming forces on the surfaces of the strip. This is achieved by eliminating, to the extent possible, all forces on the extruded strip which have a deforming effect and which therefore bring about molecular orientation.

Among the forces which cannot be completely eliminated are the shear force and the action of the pressure of the air. The deforming effects of the shear force can be minimized by resting the strip on a horizontal planar support during the cooling. Of course it is possible to minimize the action of air pressure by operating at reduced pressure, but this does not provide an advantage, because the air pressure acts fully uniformly on the entire surface, and thereby does not generate any deforming force, so long as different air pressures do not act on different regions of the surface.

In any event, deforming forces must be avoided which are of types which change the radius of curvature of the strip during cooling, e.g., which change the strip from cylindrically curved to flat form. Since as a rule the aim is to provide a perfectly flat strip, a flat shape should be attained not later than the time at which the first surface is cooled below the glass transition temperature (with the other surface remaining in the thermoplastic state).

To reduce the forces which are active, it is helpful if the first cooled surface remains free until the strip has been cooled to below the glass transition temperature. In practice, this is accomplished in that the strip is released from the smoothing device after the one surface has been cooled, and the free surface is kept free from deforming forces until the strip has been cooled to below the glass transition temperature.

A particularly advantageous embodiment of the present method is shown schematically in FIG. 1. The extruded strip 2 exits the extrusion nozzle 1 and passes into the roll gap of a polishing stack having an upper roll 4 which is smoothed, and a lower roll 5, with the upper roll being maintained at a temperature below the glass transition temperature and the lower roll being maintained at a temperature in the thermoplastic region of the plastic. After exiting the roll gap, the extruded strip is passed onto a smooth finished endless conveyor belt 6 which has been passed around the lower roll. While resting on belt 6, the strip is cooled to below the glass transition temperature.

Because the movement of the upper side of the strip is not limited by an endless belt disposed thereon, unimpeded equalization of orientations can occur in the zone directly downstream of the roll gap, which orientations have developed in and upstream of said gap. The interval between the time the strip exits the roll gap and the time it enters the cooling zone should be sufficient to allow relaxation of orientations in the thermoplastic state. In the cooling zone which follows, the strip may be vitrified free from the effects of forces which would arise from an adhering upper drum. Even in this case, isotropic contraction during cooling is not assured, because the upper side of the strip is already vitrified whereas the lower side still adheres to the steel belt. Only the thickness contraction is completely free. It is surprising, therefore, that the birefringence due to strain is still reduced to a marked degree.

In order that the extruded strip be reliably formed without defects, the conveying speed of the strip of thermoplastic material out of the extruding nozzle should be such that the strip forms a bead on the inlet side of the roll gap, and such that the entire width of the strip lies continuously against both rolls and against the endless belt running on said rolls. If the bead is too large it can promote the development of orientation; therefore the smaller the bead, the more advantageous its effect. It is desirable to continuously monitor the size of the bead, and to adjust the extrusion speed to continuously and uniformly maintain a small bead. According to Ger. Pat. 3,370,043, this can be achieved, e.g., by feeding the molding compound into the extrusion nozzle by a melting pump, and coupling the output rate of the pump with the speed of the calender.

The smoothing devices proper are the upper calendering roll 4 and the endless conveyor belt 6. The above-mentioned requirements for tolerance limits of the surface roughness, mean surface roughness, and thickness fluctuations over short distances (60 mm distances) presuppose a corresponding quality in these smoothing devices. The conditions can be achieved with known methods of smoothing and polishing. The same applies to the mutual disposition of the smoothing devices. It depends in known fashion on the rigidity of the upper calendering roll 4 and that of the lower deflecting roll 5 over which the endless belt 6 passes, and it also depends on the rigidity of the supporting stand and the quality of the bearings. Surprisingly, the inventive method facilitates the achievement of the desired sustained accuracy. With convention polishing stacks, in which the inlet rolls which form the roll gap are maintained at temperatures below the glass transition temperature of the plastic, the surfaces of the extruded strip are vitrified abruptly in the roll gap. The thinner the strip and the lower the temperature of the rolls, the greater the hazard that the solidified surface regions will meet in the center plane of the strip, whereby the strip will lose its plastic formability. As a result, extremely high compression forces will occur in the roll gap, leading to flexure of the rolls or of the roll stand, and damage to the bearings or the polished surfaces of the rolls. As soon as these forces occur, the required dimensional accuracy of the strip can no longer be achieved. To the extent that the smoothing apparatus is damaged, dimensional deviations occur when it is subsequently sought to avoid the excessive forces by an improved operating point. The hazard of excessive compression forces in the roll gap is fundamentally eliminated in the inventive method, in that one side of the strip continues to be in the thermoplastic state while in the roll gap, so that the excess material can be drawn out of the roll gap and into the bead.

On the basis of the preceding it must be assumed that in the inventive method there is flow in the thermoplastic mass in the interfacial region between said mass and the already vitrified surface layer. It has been found that this flow does not lead to harmful persistent orientations. It is hypothesized that the front of the melt region advances slightly toward the cooled surface layer after the strip exits from the roll gap, whereby orientations which have developed are substantially relaxed before the entire strip is cooled to below the glass transition temperature. The fact that orientations are avoided has a number of advantageous effects on the sheet or film produced: The most important effect is reduction of birefringence to $<50$ nm, preferably $<20$ nm (single pass). In addition, the elastic and frozen-in strains are so low that the curvature and thermal shrinkage remain appreciably below the tolerance limits.

In the roll gap, one surface of the strip is cooled below the glass transition temperature, with the other surface and most of the interior region of the strip remaining in the thermoplastic state. The layer adjoining the cooled surface, in which layer the temperature is below the glass transition temperature, should be sufficiently thick that the surface does not become reheated by the still-molten material in the interior of the strip to above the glass transition temperature after exiting the roll gap, because otherwise the smoothing achieved could be lost. On the other hand, said layer should not have a thickness greater than or equal to ½, preferably ⅓, the thickness of the strip, because otherwise one would lose the opportunity for relaxation of orientations which have already been produced. The adjustment of the optimal surface temperature in the roll gap can be accomplished by examining the finished sheet or film. An excessively high surface temperature leads to failure to meet the tolerances for surface roughness and thickness accuracy, and an excessively low surface temperature leads to increased birefringence, shrinkage, and curvature.

The controlling temperatures for adjusting the surface temperatures of the strip in the roll gap are the temperatures of the rolls (4, 5). The surface temperature T of the strip in the moment contact, is determined by the temperature $T_s$ and thermal penetrability $b_s$ of the melt, and the temperature $T_w$ and thermal penetrability $b_w$ of the material of the rolls and conveyor belt, according to the following formula:

$$T = (T_s b_s + T_w b_w) / (b_s + b_w).$$

Here $T_s$ is the melt temperature at the point of contact, and $T_w$ is the roll temperature ahead of (before reaching) the roll gap. Because it is desired to have the second surface of the strip remain in the thermoplastic state, it is advantageous to have the deflecting roll 5 and the belt 6 running on roll 5 maintained at approximately the temperature of the melt. In any event, the temperature must be in the thermoplastic range of the plastic. Known means may be used for establishing and monitoring the roll temperatures.

As an example, in processing bisphenol-A polycarbonate and other plastics with comparable processing characteristics, the upper roll is maintained at 60°–140° C. and the lower roll and the endless belt running over the lower roll are maintained at 160°–300° C.

After exiting the roll gap, and possibly after transiting a hot relaxation zone, the endless belt with the strip resting on it enters the cooling zone, where the belt 6 slides along over the cooling plate 7. Plate 7 should have a planar surface, to avoid deformations in the strip as the strip cools. Advantageously, a coolant is passed through plate 7 in the direction opposite to the movement of the belt 6, so that the lowest temperature of the plate is at the end thereof which is farthest from the calender. At said end, the temperature of the strip should now be below its glass transition temperature, over the entire thickness of the strip. During the cooling, the lower side of the strip vitrifies in a smoothed state, and in the process separates from the belt. The distant redirecting roll 8 directs the endless belt back toward the calender, while the finished extruded and smoothed strip leaves the belt. As desired, the strip may be coiled or may be cut into pieces of desired length.

The Thermoplastic Plastic

This material is chosen according to the requirements of the intended application of the sheet or film product. The plastic should be amorphous to the maximum extent possible, i.e., when cooled from the melt no crystalline zones should form in it. Its glass transition temperature should be appreciably above room temperature, e.g., $>50°$ C., preferably 80–160° C.

Preferred plastics for manufacturing optical data storage media are transparent, hard, and of high purity. Particularly preferred are polymethacrylates and polycarbonates. The invention enables the problem of optical birefringence to be substantially eliminated, so that the sheet and film produced may be used as optical data storage media. A situation of negligible birefringence may be achieved more easily the lower the anisotropy of polarizability of the monomer units of which the plastic is composed (see Henig, J., *Colloid & Polym. Sci.*, vol. 259, pp. 80–86 (1981)). Due to the numerous requirements imposed on plastics to be used for optical data storage media, as a rule it is not possible to make the anisotropy of polarizability the decisive criterion for choosing the plastic. A particularly important advantage of the invention is that optical birefringence of the plastic can be minimized to the required degree even if the said monomer units have high anisotropy.

The tendency to produce birefringence increases with increased anisotropy of the underlying units in the polymer, and with increasing orientation. A semiquantitative index of the tendency of a polymer to optical birefringence may be obtained according to Hennig, J., "Proc. Int. Sump. on Optical Memory", *Jap. J. Appl. Phys.*, vol. 26, suppl. 26-4, pp. 9–14 (1987); for birefringence of monoaxially oriented polymers. Hennig gives the following evaluations:

| | |
|---|---|
| Polymethyl methacrylate | − |
| Polyacrylonitrile | − |
| Polyvinyl chloride | + |
| Polyvinylidene fluoride | + |
| Polymethylpentene | + |
| Polystyrene | − − |
| Polyvinyl carbazole | − − |
| Bisphenol-A polycarbonate | + + |
| Polyethylene terephthalate | + + |
| Aromatic polyether sulfone | + + |
| Polybutadiene | + + |

The symbols +and −indicate the direction of the observed birefringence. Because positive and negative birefringence are equally disadvantageous, only the magnitude of the birefringence is important here. It turns out that aromatic and ethylenically unsaturated units in the polymer have a strong influence on birefringence. A more quantitative view may be provided by the quotient of the observed birefringence (delta-n) and the measured orientation function ($F_{or}$), and by the anisotropy of the basic polarizability of the monomer unit ($p_1$-$p_2$). Hennig gives the following values:

| Polymer | delta-n/$F_{or}$ | $p_1$-$p_2$ (cm$^3$) |
|---|---|---|
| Polymethyl methacrylate | −0.0015 | −0.25 × 10$^{-25}$ |
| Polyvinyl chloride | +0.0036 | +0.31 × 10$^{-25}$ |
| Polystyrene | −0.063 | −12 × 10$^{25}$ |
| Bisphenol-A polycarbonate | +0.023 | — |

The use of the present invention is particularly advantageous if the absolute values of the parameters of plastics used (and the absolute values of the parameters of their component units) obey the following inequalities:

$$|\text{delta} - n/F_{or}| > 0.01$$
$$|p_1 - p_2| > 1 \times 10^{-25} \text{ cm}^3.$$

From the standpoint of the application technology, polymethyl methacrylate and polycarbonates (particularly bisphenol-A polycarbonate) are the preferred polymers. Bisphenol-A, having a high tendency to birefringence, is of the most important for the application of the present invention. Other suitable plastics which might be mentioned are polystyrene and polyarylates (e.g., polybisphenol-A terephthalate).

The Extruded Sheet or Film

The invention allows strips>300 mm wide to be manufactured (e.g., up to 2000 mm wide). These may be used to produce cut pieces with minimum lateral dimension 300 mm in any lateral direction, for producing circular optical data storage disks or disk-halves of thickness 0.4–2 mm and diameter the standard 300 mm. Cut sheet products of greater width may be produced wherein a piece with dimensions up to 700×650 mm will not have thickness variations>0.1 mm from the nominal thickness. In the case of a sheet or film piece with lateral dimensions up to 700×650 mm and thickness <1 mm, the more stringent requirement of thickness fluctuations<0.05 mm can be met. Whereas this thickness tolerance is a prerequisite for further processing to form information storage disks and the like, for readability of the disks the thickness tolerance is less than or equal to 0.04 mm, preferably less than or equal to 0.025 mm, over a distance of 60 mm in any direction on the disk surface.

A particularly preferred material for data storage disks readable on one side only is polycarbonate plastic with thickness 0.5-2 mm. For this purpose, the invention enables manufacture of suitable polycarbonate disks with the required surface quality and sufficiently low optical birefringence.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of manufacturing an extruded, smooth-finished solid sheet or film of thermoplastic plastic having a glass transition temperature of more than 50° C., comprising the steps of:
   a) extruding said thermoplastic plastic in a thermoplastic state from a slit nozzle, to form a flat strip having a first surface and a second surface,
   b) smoothing said first surface and said second surface of said strip whole in said thermoplastic state,
   c) cooling said first surface and a layer of said strip adjoining said first surface to below the glass transition temperature, while maintaining said second surface and the remainder of said strip in the thermoplastic state, said layer of said strip adjoining said first surface being sufficiently thick hat said fist surface does not become reheated by the thermoplastic plastic in the thermoplastic state in the remainder of said strip; and
   d) cooling said strip under conditions which minimize deforming forces on the surfaces of the extruded strip.

2. The method of claim 1, wherein said smooth-finished sheet or film has a thickness of <1 mm.

3. The method of claim 2, wherein said smooth-finished sheet or film has a thickness of <0.5 mm.

4. The method of claim 1, wherein said thermoplastic plastic has an absolute value of the quotient of the observed birefringence (delta-n) and the measured orientation function ($F_{or}$) greater than 10×10$^{-3}$.

5. The method of claim 1, wherein said surfaces of said strip are smoothed by means of a first and a second smoothing device, wherein said first smoothing device has a surface temperature which is below the glass transition temperature of said thermoplastic plastic, and said second smoothing device has a surface temperature which is in the thermoplastic state domain of said thermoplastic plastic.

6. The method of claim 5, wherein after a firsts surface of said strip is cooled to below the glass transition temperature, said strip is freed from said first smoothing device, and the free surface is kept free from deforming forces until the strip is cooled to below the glass transition temperature.

7. The method of claim 1, wherein said thermoplastic plastic is polycarbonate plastic.

8. The method of claim 1, wherein said layer of said strip adjoining said first surface has a thickness not greater than one-half of the thickness of said strip.

9. The method of claim 8, wherein said thickness of said layer adjoining said fist surface is not greater than one-third of the thickness of said strip.

10. The method of claim 5, wherein said surface temperature of said first smoothing device is 60°-140° C., and said surface temperature of said second smoothing device is 160°-300° C.

11. An apparatus for manufacturing an extruded, smooth finished solid sheet or film, which sheet or film is comprised of thermoplastic material, said apparatus comprising:
   (a) a slot nozzle fed by an extruder for producing a flat extruded strip;
   (b) a smoothing apparatus comprised of at least one smooth-finished upper roll and a lower roll, for smoothing said flat strip in a gap between said upper and lower rolls;
   wherein said upper roll has a cooling means;
   and said lower roll has a means for heating said lower roll to a temperature in the thermoplastic state domain of the plastic;
   (c) a planar cooling plate; and
   (d) a smooth finished endless belt which is passed around said lower roll and is guided over said planar cooling plate and a redirecting roll, back to said lower roll.

* * * * *